Oct. 12, 1926.　　　　　　　　　　　　　　　　　　　1,603,213
J. F. REILLY
ORE SEPARATION PROCESS AND MACHINE
Filed Dec. 18, 1923　　　5 Sheets-Sheet 1

FIG. 1

INVENTOR
JAMES F. REILLY
By Paul, Paul + Moore
ATTORNEYS

Oct. 12, 1926.
1,603,213
J. F. REILLY
ORE SEPARATION PROCESS AND MACHINE
Filed Dec. 18, 1923    5 Sheets-Sheet 3

INVENTOR
JAMES F. REILLY
By Paul, Paul & Moore
ATTORNEYS

Patented Oct. 12, 1926.

1,603,213

UNITED STATES PATENT OFFICE.

JAMES F. REILLY, OF PATAGONIA, ARIZONA.

ORE SEPARATION PROCESS AND MACHINE.

Application filed December 18, 1923. Serial No. 681,372.

This invention relates to improvements in ore separation processes and machines, adapted for use in separating the non-metallic substances contained in the ore from the metals, and the different metals or metallic substances from one another. The invention relates more particularly to processes and machines adaptable for use in conjunction with what is commonly known as "dry processes of separation", wherein the separation is made with the materials in a dry state, after the quartz or ore has been ground and pulverized to a certain degree of fineness. I have in this specification used the term "metallics" to designate generally all the metallic substances in the ore, and the term "gang" to designate the non-metallic substances.

There are two methods of processes in use at the present time for ore separation. The first, commonly known as the "wet process" employs water, in conjunction with vibratory screens, rapidly revolving cylinders, and other apparatus, through which the pulverized ore is passed in the process of separating the metallic substances from the non-metallic tailings or gang. Separation is obtained by mechanical agitation and movement of the separating means, through which the ore is passed with a flow of water. In order that better separation may be obtained, chemicals are usually introduced into the water before it passes through the separating means. After the chemically treated water has passed through the apparatus, it is discharged therefrom as waste, into a suitable drain pipe or other receiving means, from whence it is usually discharged into a stream or onto the surface of the ground. The above method of ore separation has been found very undesirable and impractical owing to the pollution of streams, caused by discharging the chemically treated water thereinto, and also as a result of the disastrous effect it has on vegetation, etc. with which it comes into contact when flowing over the surface of the ground. Such a process requires a constant flow of water in its operation in order to effect separation, and can therefore be successfully employed only in localities where sufficient water is obtainable. It is therefore, not well adapted to districts having frequent water shortages or to any district where it is difficult to obtain water.

The second method employed in the separation of ore concentrates, is commonly known as the "dry process". This latter process, in like manner, employs the use of various mechanically operated devices or separating means through which the pulverized ore is passed, in a dry state, for separation. Owing to the vibratory action of the separating means and as a result of the dryness and fineness of the pulverized ore, the lighter and minute particles thereof will rise above the machine in the form of dust, and which is inhaled by the workmen. The dust thus generated by the constant agitation of the pulverized ore during the process of separation, has been found very detrimental to good health, thereby impairing the lives of those in attendance of the apparatus. This latter process, therefore, has also been found impractical and unpopular.

In both of the above-mentioned processes, attempts are made to separate from one another the different metallics contained in the ore, by first pulverizing the ore, in which state it is delivered onto the surface of the separating means or table for separation. From actual experience, I have found it to be practically impossible to make a complete separation of the various metallics contained in a given ore, unless the granules or particles of the pulverized ore are of uniform size, irrespective of substance. This, I have found to be caused by the differences in the specific gravity of the different metallics, the action or movement of the separating table or means being such as to cause the various metallics or metal contents to be conveyed over the surface thereof to their respective places, depending upon the specific gravity thereof. Therefore, in order to obtain a thorough and complete separation of the metallics, it is necessary that the different sizes of granules or particles constituting the pulverized ore, be separated from one another in order that each thus separated size may be independently passed over or through the separating means.

The novel ore separation process and machine, featured in this invention, employs the dry process of separation. After the ore has been pulverized it is passed through a series of grading screens or sieves and the different sized particles contained therein are separated from one another and discharged into their respective bins or receiving means. When the ore has thus been graded as to size, each size is independently passed over the surface of my improved ore separating machine against a flow of air, whereby a thorough and complete separation is obtained of the various metallics contained in the ore. Means are provided for accumulating the lighter materials, such as dust rising above the machine as a result of its vibratory action, in conjunction with the flow of air therethrough. Means are also provided for conveniently controlling and regulating the flow of air through any portion of the surface of the table.

The particular object of the invention therefore, is to provide an improved ore separation process and machine, the latter being of simple and inexpensive construction and also being positive in its operation.

Other objects of the invention will more fully appear from the following description and the accompanying drawings and will be pointed out in the annexed claims.

The drawings disclose a structure designed to carry out the various objects of the invention, but it is to be understood that the invention is not confined to the exact features shown, as various changes may be made within the scope of the claims which follow.

In the accompanying drawings forming part of this specification.

In the description of the novel ore separation process and machine featured in this invention, the machine and its operation will first be described in detail, after which my improved ore separation process will be fully described.

Figure 1:
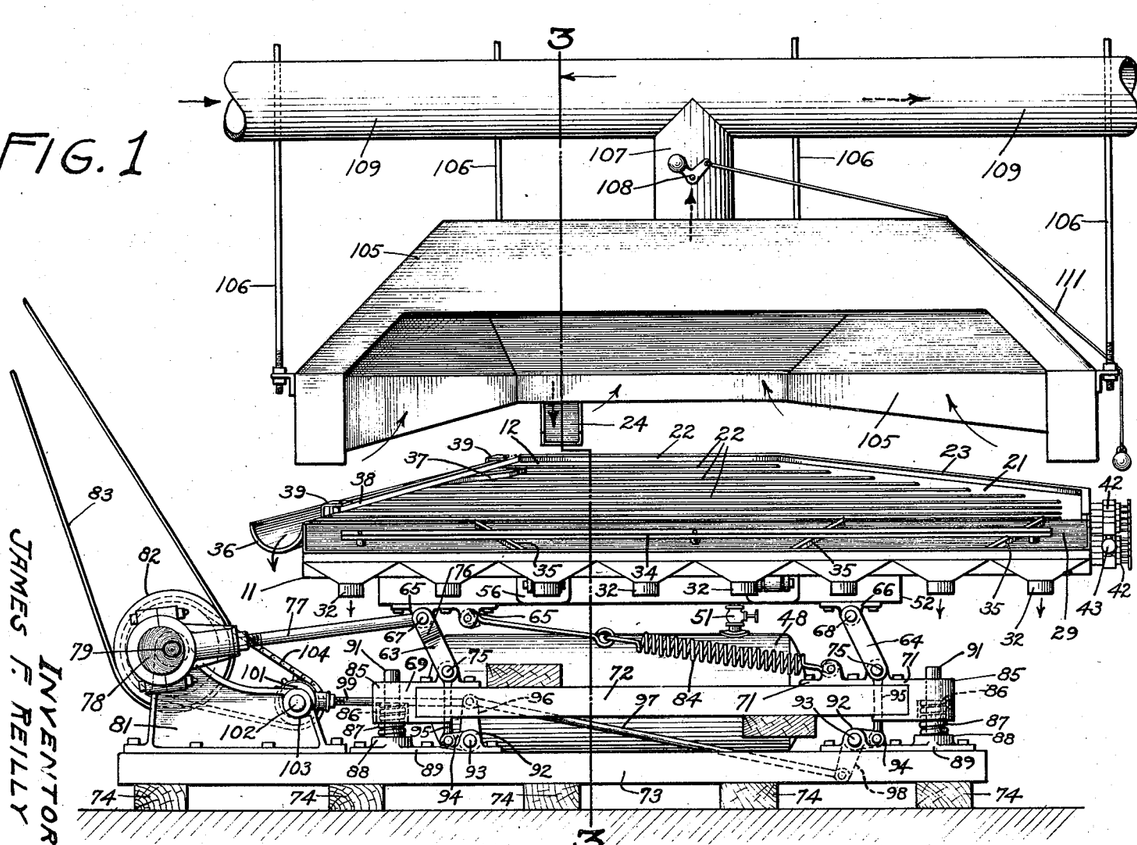
Figure 1 is a view in side elevation of my improved ore separating machine, showing the operating mechanism thereof and also showing the means provided for carrying off the dust.
Figure 2:
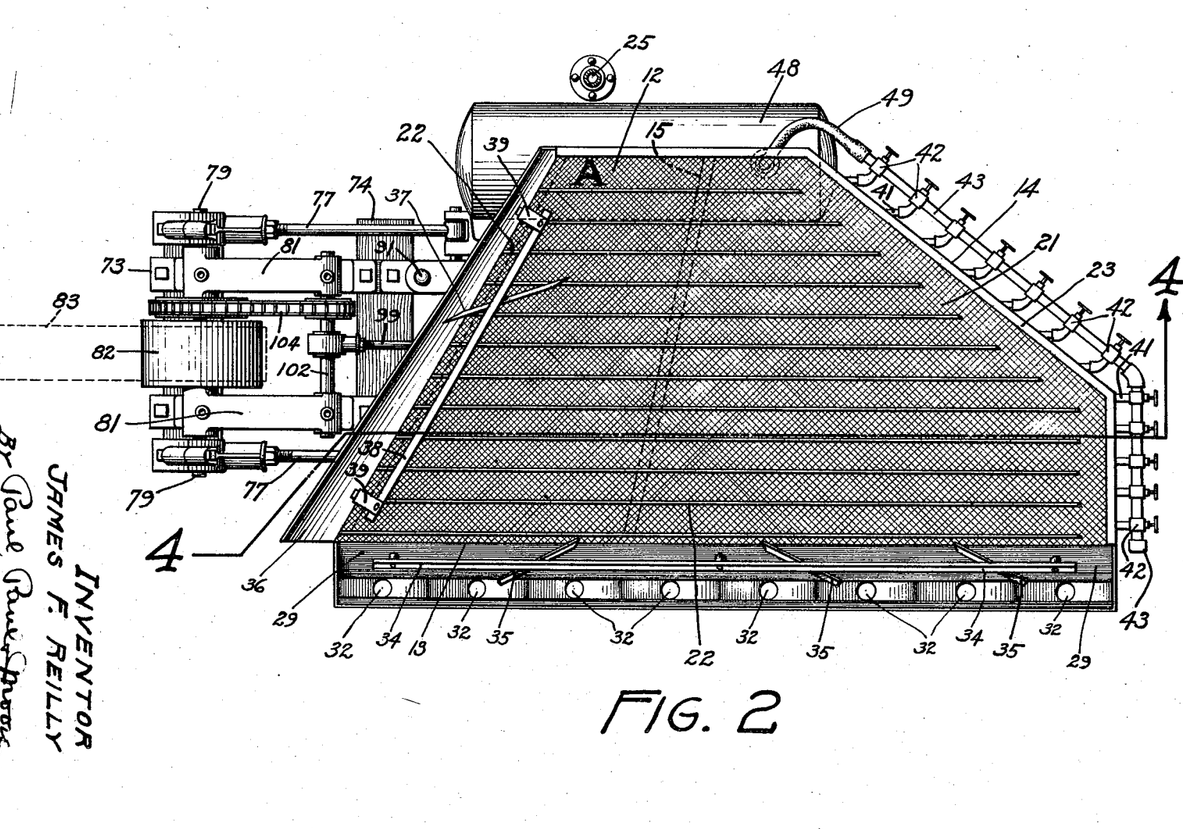
Figure 2 is a plan view of Figure 1, showing the means provided at one end of the table for regulating and controlling the flow of air through the upper screened surface thereof.
Figure 3:
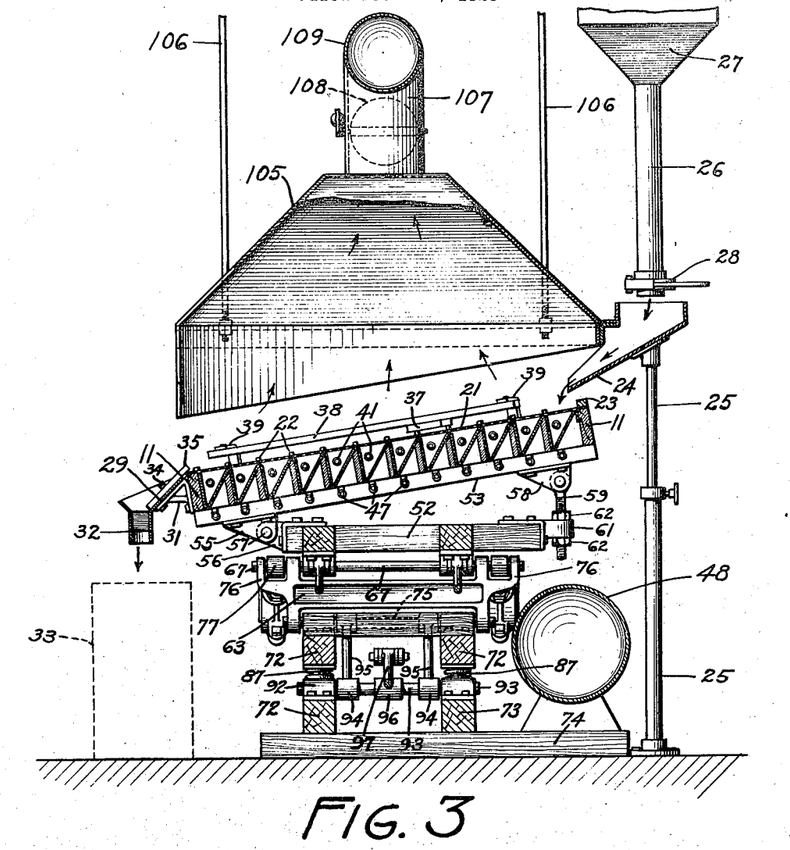
Figure 3 is a vertical sectional view on the line 3—3 of Figure 1, showing a division of the table into a plurality of compartments, and also showing means provided for adjusting the angle thereof.
Figures 4, 5:
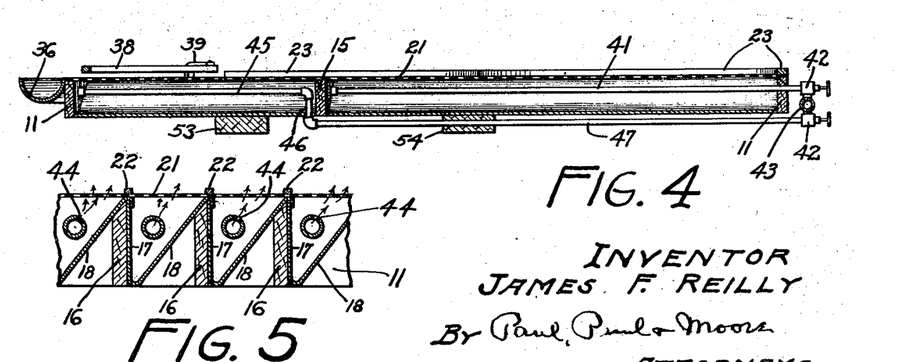
Figure 4 is a detail sectional view on the line 4—4 of Figure 2, showing the means provided for supplying air to each compartment of the table, and also showing how the supply of air to each such compartment may be independently regulated and controlled.
Figure 5 is a detail sectional view of a portion of the table showing the air supply pipe provided in each compartment thereof for directing a flow of air upwardly through the screened surface of the table.

As shown in Figures 1, 2 and 3, the oscillatory table or separating means of the machine preferably consists of an irregularly shaped frame 11 arranged at an angle upon a suitable supporting frame, hereinafter described. The feeding end 12 of the table is preferably arranged at an angle with reference to the front or discharge side 13 thereof, while the opposite or control end thereof is preferably formed to provide an inclined end portion 14. A cross-beam 15 is preferably interposed between the opposed side members of the frame, primarily for the purpose of dividing the table into two sections, and incidentally to provide a reinforcement therefor. Each of the sections thus formed by the cross-beam 15 is sub-divided into a plurality of comparatively small divisions or compartments extending lengthwise of the table. These subdivisions or compartments are clearly shown in Figures 3, 4 and 5, and are preferably constructed by means of longitudinal bars 16 arranged in parallel relation and having their ends suitably secure to the frame 11 and to the cross-beam 15. Troughs, usually of metal, preferably V-shaped and each comprising a substantially vertical wall 17 and an inclined wall 18, are positioned between the longitudinal bars 16 and are suitably secured thereto. The upper edge of each bar 16 is preferably beveled or inclined to receive the correspondingly inclined wall 18 of the V-shaped trough, which preferably has its upper edge bent or folded downwardly to provide a depending flange 19, adapted to fit over the upper edge of the wall 17 of the adjacent trough. Thus, a comparatively sharp ridge will be provided between each pair of troughs or compartments.

The upper surface of the table is preferably covered with a suitable webbing or covering 21, preferably of closely meshed cloth, which covers the entire surface thereof. This webbing is marginally secured to the frame 11 and to the dividing ridges between the table compartments, by means of small raised ribs or riffles 22, placed on top of the webbing and suitably secured to the ridges, as particularly shown in Figure 5.

The ribs or riffles 22 preferably extend from the feeding end 12 of the table to within a short distance of the control end thereof, a small space being provided between the rear terminal ends of the riffles and a raised border strip 23 provided on the table and extending around the end and back side thereof, as shown in Figure 2. The purpose of the spaced riffles 22 is to retard the flow of pulverized ore as it is passed over the porous surface of the separating table during the process of separating the metallics from the gang or refuse material and finally from one another. Also by providing a space between the ends of the riffles and the raised strip 23, the heavier metallics conveyed to the end of the table will be conveyed to the discharge side thereof without retardation.

As shown in Figure 3, the material is discharged or fed onto the inclined surface of the table at the upper rear side thereof substantially at the point indicated by the letter "A", in Figure 2, from a suitable feeding spout 24, preferably supported by means of an upright adjustable stand 25, here shown as resting upon the floor. The pulverized ore is preferably delivered into the feeding spout 24 from a conveyor 26 leading from a suitable hopper 27. A feed control valve 28 is preferably arranged in the conveyor 26 adjacent the feeding spout 24, by means of which the feeding of the material may readily and conveniently be regulated and controlled in order that the apparatus may be operated at its most efficient capacity. As the material is thus fed onto the inclined surface of the table, the mechanical movements imparted thereto will cause the material to be passed over the surface of the table with the resultant separation of the different ore metallics, as will be more fully described hereinafter.

An inclined plate 29 is preferably provided at the front side of the table, and is secured thereto by means of brackets 31, bolted to the table frame 11, as shown in Figure 3. A series of receiving spouts 32 are secured to the depending edge of the inclined plate 29, adapted to receive the different materials and convey them to their respective bins 33, shown in dotted lines in Figure 3. A bar 34 is mounted upon the inclined plate 29 in spaced relation thereto. This bar functions as a means to support a plurality of adjustably and removably mounted ore separating gates or cleats 35 which are inserted between the surface of the plate 29 and the bar 34 so as to cause the material to be shunted or conveyed to the proper receiving spout 32 and thereby directed to the proper bin 33. These cleats may be arranged at any desired angle, as shown.

A trough 36, preferably having its discharge end relatively wider and deeper than the other end thereof, is preferably provided on the truncated feeding end of the table, as particularly shown in Figure 2. This trough is adapted to receive the lighter particles of gang or refuse after the heavier materials have been separated therefrom. A discharge gate or cleat 37 is similarly provided at this end of the table, adapted to direct the lighter material from the table into the trough 36. This cleat is similarly supported by means of a bar 38 arranged to overhang the table and preferably secured thereto by means of upright angular brackets 39. By the employment of the above described trough, and means for directing the lighter material from the table into the trough, the lighter material adjacent the feeding end of the machine, after the heavier metallics have been separated therefrom, may be removed from the table, thereby preventing it from being unnecessarily agitated and thus reducing the amount of dust generated.

In order to obtain a thorough and complete separation of the different materials when they are passed over the separating table, I have found it necessary to direct a flow of air through the upper porous or screened surface of the table in an upwardly direction. I have also found it essential that means be provided whereby the flow of air through any given portion of the table may be independently controlled and regulated with reference to the amount of air flowing through other portions of the table. Such means consists preferably in the provision of an air supply pipe mounted in each V-shaped compartment of the table, as clearly shown in Figures 4 and 5. As here shown, each compartment at the control end of the table has an air pipe 41 suitably mounted therein. One end of this pipe passes outwardly through the frame 11, and is connected to a suitable control valve 42, which is connected to a main supply pipe or manifold, 43. A series of small orifices 44 are provided in the upper portion of each pipe 41, extending from the closed end of the pipe to the wall of the frame 11, or substantially the length of the compartment. These holes are preferably arranged at a slight angle so as to direct the flow of air emanating therefrom, in an upwardly direction through the covering 21, and at the same time in a direction towards the feeding side of the table, or against the flow of material passing over the surface of the table, as indicated by the arrows in Figure 5.

Each compartment at the feeding end of the table is similarly provided with an air pipe 45, which likewise is provided with a series of small orifices 44 through which air may be blown through the covering 21 of the table. A downwardly extending pipe section 46 connects the orificed pipe 45 in each of these compartments, with a pipe 47, having its outer end connected to a similar control valve 42 by means of which the supply of air to the feeding end of the table may be regulated and controlled, as desired. As shown in Figure 2, the main air supply pipe or manifold 43 preferably extends around the control end of the table, and at the rear thereof is connected by means of a flexible hose connection 49, to a suitable source of air supply such as the tank 48. A main cut-off valve 51 (see Figure 1) is preferably provided in the flexible hose connection 49, adjacent the supply tank 48, so that the supply of air to the table may be entirely cut off, when desired.

From the foregoing it will readily be seen that by thus dividing the table into a plurality of small compartments, and by the arrangement therein of the air supply pipes 41 and 45, I am enabled by the use of the control valves 42, to regulate and control the flow of air through any given portion of the table top, independently of other portions thereof. Therefore, in the operation of the machine, should it be found desirable and necessary to reduce the flow of air through certain portions of the table top, and to increase it in other portions thereof, in order to obtain a complete separation of the different materials, such regulation of the flow of air through the table may be simply and conveniently effected by the manipulation of the control valves 42.

As shown in Figure 3, the separating table is preferably adjustably mounted upon a rectangular frame 52 and may readily be adjusted to the proper angle required to effect efficient separation. Cross-beams 53 and 54 are suitably secured to the underside of the frame 11 of the table and have similar pivot brackets 55 secured thereto adjacent the front side of the table. These brackets are in pivotal connection with suitable brackets 56, on the frame 52, by means of pivot pins 57. The brackets 56 are suitably secured to the front side of the rectangular frame 52 and provide a substantial support for the front side of the table. Brackets 58 are secured to the rear end of the beams 53 and 54 and are pivotally connected to a threaded eye-bolt 59, adjustably secured to brackets 61 secured to the frame 52, by means of the adjusting nuts 62, in threaded engagement therewith. Thus, it will readily be seen that the angle of the table may readily be adjusted by the simple rotation of the nuts 62.

Means are provided for imparting an oscillatory movement to the table in order to convey the material over the porous and riffled surface thereof. Such movement is preferably obtained by the provision of pivotally mounted supporting yokes 63 and 64, having their upper ends pivotally connected to brackets 65 and 66, respectively, preferably secured to the underside of the rectangular frame 52, by means of shafts or rods 67 and 68 passing therethrough, as shown in Figures 1 and 2. The lower ends of the yokes 63 and 64 are similarly connected to brackets 69 and 71 secured to a yieldably mounted frame 72, which is preferably supported by beams 73 carried by the cross rails 74. Rods 75 connect the yokes 63 and 64 to the brackets 69 and 71. A fork 76 is preferably formed on each end of the yoke 63, and connecting rods or pitmen 77 are pivotally connected thereto, having their other ends rotatably mounted upon suitable eccentrics 78. These eccentrics are secured to a transverse drive shaft 79 which is rotatably mounted in the drive supporting brackets 81 and is preferably operable by means of a pulley 82 and belt 83. (See Figure 1.)

As the table is mounted upon the supporting yokes 63 and 64, when it is at the end of its back stroke it will be at the height of its movement, and the supporting yokes 63 and 64 will be in a substantially vertical position. Therefore, when the table moves forwardly, or on its forward stroke, it will simultaneously be moved downwardly, with the movement of the yokes rocking on the rods 75. Suitable tension means are preferably provided to counteract the weight of the table in its forward downward movement. Such means preferably consists in the provision of a pair of coiled tension springs 84 interposed between and secured to the brackets 65 and 71 at each side of the machine, as clearly shown in Figure 1. Thus, when the table moves forwardly, or to the left, when looking at the apparatus as shown in the above mentioned figure, the springs 84 will be elongated or put under tension, thereby counterbalancing the weight of the table to the extent that the pitmen 77, and associate parts, will not be subjected to unnecessary strains, and smoother operation will also be assured.

It has also been found desirable in the operation of this novel ore separating machine, to impart a vibratory action to the table simultaneously with its being oscillated. The purpose of this vibratory action is primarily to cause the material to be thoroughly agitated in passing over the surface of the table. This latter movement of the table, in conjunction with the oscillatory movement thereof, will cause the material to be kept in constant motion and at the same time to be conveyed over the surface of the table.

To effect this vibratory movement the table and its supporting means are preferably yieldably mounted upon the longitudinal supporting beams 73. Such form of mounting is shown in Figure 1, wherein the brackets 69 and 71, are provided with opposed end portions 85, having inverted sockets 86 formed in the lower faces thereof. Suitable compression springs 87 are preferably mounted in the sockets 86, and have their lower ends resting upon raised bosses 88 formed on the table supporting brackets 89, positioned directly beneath the sockets and secured to the longitudinal beams 73. Each such bracket is provided with an upwardly extending guide pin 91, which passes upwardly through the spring 87 and socket 86, and through an aperture provided in the end portion 85. Thus, the entire table and its supporting means will be yieldably mounted upon the beams 73. The table supporting frame 72 is therefore adapted to vertical movement but is prevented from lateral and longitudinal movement by means of the upright guide pins 91.

Each bracket 89 is preferably provided with a bearing 92 adapted to support one end of a rock-shaft 93, the other end of which is supported by means of the complementary bearing provided in the similar bracket at the other side of the frame. Such a shaft is preferably mounted adjacent each end of the frame 72. Arms 94, preferably forked, are secured to these rock-shafts adjacent the bearings 92, and have relatively short connecting links or rods 95 pivotally connected thereto, the upper ends of which are connected to the transverse rods 75. An upright arm 96 is mounted on the rock-shaft 93 adjacent the drive end of the machine. A connecting rod 97 connects this arm with a depending arm 98 mounted upon the rock-shaft at the opposite end of the machine. A pitman 99 has one end pivotally connected to the arm 96 and the connecting rod 97, and its other end is suitably mounted upon an eccentric 101, secured to an auxiliary shaft 102 which is rotatably mounted in bearings 103 provided in the two drive supporting brackets 81. This shaft is operable from the main drive shaft 79, preferably by means of a chain and sprocket drive 104.

Thus, by the employment of the mechanism, above described, it will readily be seen that as the auxiliary shaft 102 is rotated the pitman 99 will oscillate the upright arm 96, with the resultant rocking of the shaft 93, and the depending arm 98, being connected to the arm 96 by means of the connecting rod 97, will likewise be oscillated, thereby causing the other rock-shaft 93 to be similarly rocked in its bearings 92. Such rocking of the rock-shafts 93 will impart a slight vertical, or up and down, movement to the table supporting frame 72, and therefore to the table, by means of the substantially horizontal arms 94 and the connecting links 95, connecting these arms to the transverse shafts or rods 75. Therefore, when the main drive shaft 79 is rotated, the table will be oscillated and simultaneously a vibratory action will be imparted thereto, which will cause the material to be kept in constant motion as it is passed over the surface of the table.

Another feature of this invention resides in novel means, provided directly above the table, for carrying off the lighter materials which rise in the form of dust, as a result of the constant agitation of the material as it is passed over the surface of the table against the flow of air.

Such means preferably consists in the provision of an aspirator or dust collector preferably arranged in spaced relation to the table and in such a manner as to substantially cover the entire surface thereof. The aspirator consists of a housing 105 preferably shaped to conform substantially to the outline of the table. This housing is suitably supported over the table, preferably by means of suspension rods 106. A pipe 107, having a suitable valve 108 mounted therein, leads from the upper central portion of the housing 105, and is connected to a substantially horizontal suction trunk 109. This trunk may be connected to a suitable suction means, such as a suction fan, not shown, adapted to draw air through the trunk for the purpose of carrying off the dust, etc., and discharging it into a suitable receiving means, not shown. Should a battery of ore separating machines be operated in series, or be positioned adjacent one another for operation then the aspirator of each such machine may be connected to a main suction trunk extending longitudinally over the machines, as indicated in Figure 1, wherein the trunk is shown broken away at each end. A valve actuating means, or cord 111, is connected to the valve 108 and extends to a point within convenient reach of the operator, preferably at the valve or control end of the table. By the use of this valve the suction through the aspirator may be conveniently regulated, and, if desired, may be interrupted or entirely shut off.

In the operation of the novel ore separating machine here shown and described, separation is accomplished by means of the differences in the specific gravity of the different materials in conjunction with the mechanical movements imparted to the separating table over which the material is passed against a controlled flow of air. Therefore, in order that advantage may be taken of the differences in the specific gravity of the different materials in the separation thereof, it is essential that the ore, after having been pulverized, be passed through a grading or sizing means, as will be subsequently described in order that the different sized particles constituting the thus pulverized ore, may be separated from each other as to size, before being passed over the separating table for the purpose of separating from one another the different metallics contained therein.

Figures 6, 7, 8:
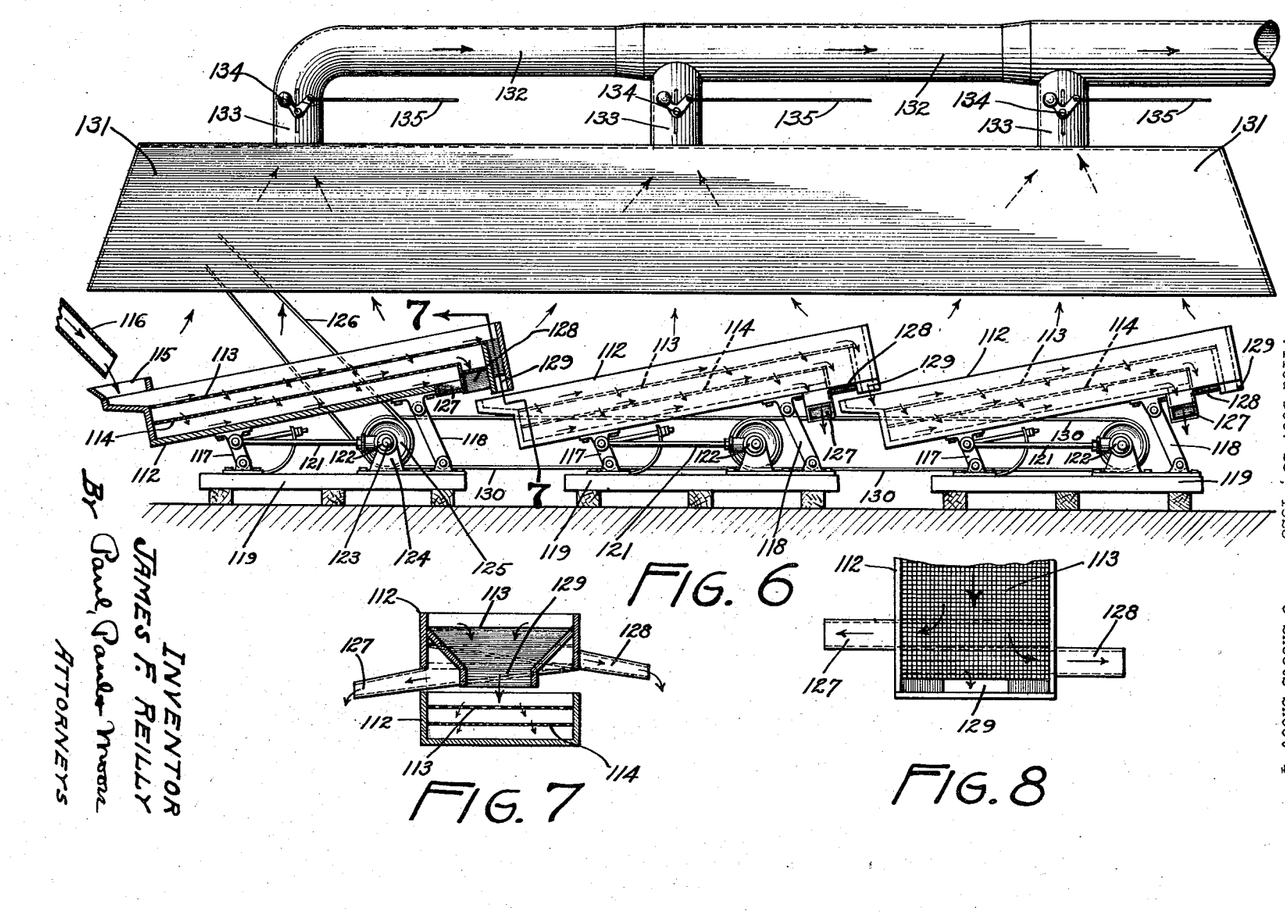
Figure 6 is a view in side elevation of a battery of grading or separating screens, one of the units being shown in section to more clearly illustrate the construction thereof.
Figure 7 is a cross sectional view on the line 7—7 of Figure 6, showing the means provided at the sides of the screen for conducting the separated materials therefrom.
Figure 8 is a plan view of Figure 7.

A common form of ore-sizing and grading means is shown in Figures 6, 7 and 8, wherein a battery of such ore sizers and graders are shown connected together for a simultaneous operation. As here shown, each unit comprises preferably an inclined rectangular casing or frame 112, having mounted therein a plurality of screens, preferably two. The upper screen 113 is slightly coarser than the lower screen 114. The receiving end of the casing 112 is preferably provided with a hopper 115 into which the pulverized ore is discharged from a suitable means, such as the spout 116, for delivery onto the upper screen 113. The casing 112, in which the screens are mounted, is carried by the oscillatory supporting arms 117 and 118, pivotally mounted upon a frame 119, and operable by means of a pitman 121, connected to an eccentric 122, which is mounted upon a suitable drive shaft 123, carried by the brackets 124. A drive pulley 125 is mounted upon one end of the shaft 123 and is connected to a suitable source of power, not shown, preferably by means of a belt 126. Thus, when the shaft 123 is rotated, an oscillatory movement will be imparted to the casing 112 and therefore to the screen 113 and 114. Such movement will cause the pulverized ore to be conveyed up the inclined surface of the upper screen 113. As it thus passes over the surface of this screen the smaller particles will drop therethrough, and onto the surface of the relatively finer meshed screen 114 arranged beneath it. The material thus passing through the upper screen 113, will, in like manner, be conveyed towards the discharge end of the casing 112 by the similar movement of the lower screen 114. As the finer material thus passes upwardly over the inclined surface of the lower screen 114, the still finer material will pass through the screen 114 and drop onto the inclined bottom of the casing from which it will be discharged, through a spout 127 provided at the discharge end of the grader. A similar spout 128 is provided to receive the material discharged from the lower screen 114. The coarser material, or that which is too coarse to pass through the screens 113 and 114, will be discharged through an opening 129 and into the receiving end of the adjacent sizer and grader. If desired, a slight vibratory action (by means not shown) may be imparted to the casing 112, in order that a more thorough and complete separtion of the different sized ore particles may be obtained in passing the pulverized ore through the grader. The two screens in the second unit are of a relatively coarser mesh than those of the first unit, thereby causing a similar separation of the material to be effected, however, of a relatively larger size. The material that is too coarse to pass through the upper screen of the second unit will be discharged into the third unit for final separation. The screens in the third unit are in like manner relatively coarser than those of the second unit, thereby permitting the remainder of the material to be passed through the upper screen thereof, and onto the lower screen from whence the material, not passing therethrough, will be discharged into the spout 128. The relatively finer material passing through the lower screen will similarly be discharged onto the inclined bottom of the casing 112 from whence it will be discharged into the spout 127 for final discharging into a suitable receiving means. Such a separation or grading of the different sized ore particles is of the utmost importance in order that the specific gravity of the different metallics may properly function to separate such metallics from one another as a result of the mechanical movements of the separating table or machine. The units may be belted together by means of a belt drive 130, as shown.

A dust collector or aspirator is preferably mounted over the grading screens, above described, and functions in a manner similar to that described with reference to the aspirator shown in Figures 1 and 3. This aspirator consists of a housing 131 positioned above the screens and supported by suitable means, not shown. A suction trunk 132 is mounted above the housing 131 and is connected thereto by upright pipe sections 133 preferably directly over each unit. Each such pipe section is provided with a suitable valve 134 whereby the suction therethrough may be regulated and controlled as desired. A valve operating cord 135 is preferably connected to each valve 134 as shown.

After the different sized particles of the pulverized ore have thus been separated from one another and each size discharged into its respective receiving bin, each such size is independently passed over the inclined surface of the improved ore separating machine, hereinbefore described, whereby the different ore metallics contained therein are first separated from the gang and other refuse material and then from one another and delivered into their respective receiving means.

As shown in Figure 2, the pulverized ore, after having thus been graded and sized, is delivered from the feed spout 24 onto the inclined surface of the separating table substantially at the point indicated by the letter "A" on the drawing. As a result of the oscillatory and vibratory movement of the table the material will be gradually conveyed across the porous surface of the table top against a flow of air upwardly blown through the screened or porous covering 21 of the table, as particularly shown in Figure 5. The amount of air blown through the covering 21 of the table is controlled by means of the valves 42 provided at the control-end of the table, and is so regulated as to cause only the lighter and finer materials, such as dust, to be upwardly blown into the aspirator from whence they will be carried off by the suction trunk 132 and discharged into a suitable means, not shown.

As a result of the inclined position and the oscillatory movement of the table the material will tend to travel across the surface of the table, and the vibratory action thereof will cause it to be kept in constant agitation, a jumping or bouncing action being imparted thereto. This action is assisted by means of the flow of air through the table which tends to lift the ore particles as they are passed over the table. As the different metallics and materials are thus kept in constant agitation while passing over the porous and riffled surface of the table, the differences in the specific gravity of the different materials will cause the heaviest metallics to be conveyed substantially to the control-end of the table where they will be discharged into the receiving spout 32 adjacent that end of the table. The lighter materials, having a lower specific gravity, will travel only partially the length of the table before reaching the inclined plate 29 at the front of the machine from whence they will be conducted to their respective receiving means, by the adjustably mounted cleats or gates 35 and the intermediate spouts 32.

A clearer understanding of the above principle of separation may be had from the following explanation. Assuming that it is desired to separate the metallics from an ore comprising several metallics, such for example, as iron, zinc and lead; as the pulverized ore is passed over the surface of the table, the action of the table will tend to convey the material towards the control end of the table simultaneously as it is traveling downwardly thereover, as a result of the inclined position of the table. Owing to the specific gravity of lead being greater than that of either zinc or iron, it will be moved, or in other words, thrown a greater distance over the surface of the table for each oscillatory movement thereof, subsequently reaching the control-end or lower right-hand corner of the table for final discharging therefrom. The specific gravity of zinc being relatively less than that of lead but greater than that of iron, will cause the zinc to be conveyed the next farthest distance from the feeding end of the table, while the specific gravity of iron being relatively lower will cause the iron particles to travel a shorter distance lengthwise of the table before being discharged onto the inclined plate 29, thereby effecting a separation of the above materials. The lighter material, such as the gang or refuse, has a very low specific gravity and is therefore not greatly affected by the oscillatory movement of the table tending to convey it longitudinally over the surface thereof. Owing to the angle of the table and the vibratory movement thereof, the lighter material or gang will travel substantially in a transverse path, over the table for final discharging into the spouts 32 adjacent the drive end of the table. In passing the material over the surface of the table, should it be found that the heavier metallics are quickly separated from the gang, then the cleat or gate 37 may be so positioned as to conduct a portion of the gang from the table into the trough 36 provided at the drive end thereof, thus preventing such material from being unnecessarily passed over the surface of the table and reducing the amount of dust generated. By means of the valves 42 the flow of air through any portion of the table may be regulated and controlled independently of other portions thereof, as for example, it may be desired to decrease the flow of air through the feeding end of the table in order to avoid blowing the finer and lighter material off the table, while at the same time it may be found desirable to increase the flow of air through other portions of the table in order that the lighter materials may be completely separated from the heavier metallics.

Thus, it will readily be seen and understood, that, as a result of the differences in the specific gravity of the different materials, the action or mechanical movements of the separating table, in conjunction with the flow of air therethrough, will cause a complete and thorough separation of the metallics from the gang, followed by the subsequent separation from each other of the different metallics and discharging them into their respective bins or receiving means.

Having thus described my improved ore separating machine and its operation, I will next describe my preferred process or method of treating the ore in order to obtain a thorough and complete separation of the different substances or materials contained therein. In order to afford a clearer explanation of my improved ore separation process, reference is made to Figure 9 of the drawings which shows a diagrammatic view of means for carrying out the entire process.

Figure 9:
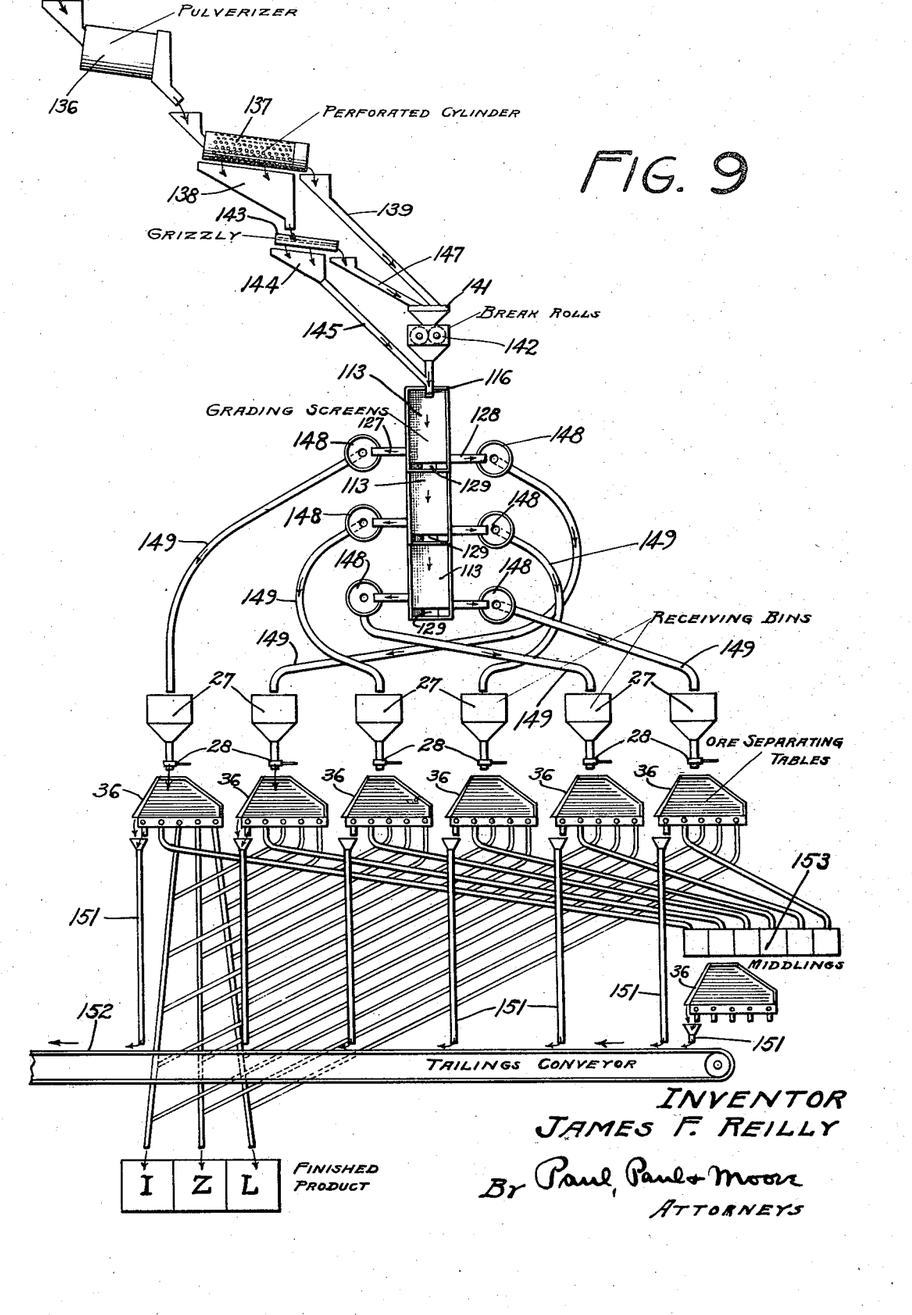
Figure 9 is a diagrammatic view illustrating means for carrying out my improved process or method of treating ore to separate the different metallics from the gang and finally from one another.

As here shown, the ore is first passed through a standard form of pulverizer 136, and broken up or pulverized, after which it is preferably passed through a perforated cylinder 137, and the finer particles separated therefrom. The finer materials passing through the perforated wall of the cylinder 137 are preferably delivered into a hopper 138 beneath the cylinder. The coarser material is discharged from the end of the cylinder into a suitable conveyor spout 139, adapted to convey such material to a hopper 141 positioned above a suitable pulverizing means such as the break rolls 142. The material discharged into the hopper 138 from the perforated cylinder 137, is preferably discharged onto a grizzly or vibratory screen 143, of ordinary construction, and the finer material passing therethrough will be delivered into a suitable receiving hopper 144, arranged therebeneath, and from which it will be conveyed, by means of the conveyor 145, to a suitable receiving means, not shown, preferably positioned above the receiving end of the first unit of the grading screens, shown in Figure 6. The coarser material, not passing through the grizzly, will be discharged into a conveyor 147 and delivered to the hopper 141. All of the coarser material discharged into this hopper will be passed through the break rolls 142 and similarly discharged into the receiving means positioned above the hopper 115 of the first unit of the grading screens, shown in Figure 6. The material passing through the break rolls 142 will be pulverized substantially to the same degree of fineness as that passing through the grizzly 143.

After the ore has thus been pulverized and screened to a certain degree of fineness it is passed through the grading screens, shown in Figure 6 and the different sized particles contained therein separated from one another, regardless of substance, and discharged into their respective receiving means, as shown in Figure 9. I have here shown a series of bins 148 arranged at each side of the grading screens into which the different sized ore particles are discharged as they are separated from one another. The finest or smallest ore particles are preferably discharged from the grading screens into the first bin 148, the next finest into the next bin, and so on until all of the different sized ore particles have passed through the grading screens 113 and 114 as hereinbefore described, and have been discharged into their respective bins 142. I have here shown six bins 148 but it is to be understood, however, that I do not limit myself to this particular number as any number may be employed depending upon the fineness or number of different sizes to which the material is to be graded preparatory to being passed over the ore separating table.

As hereinbefore stated, in order to take advantage of the differences in the specific gravity of the different materials or substances contained in the ore, to effect separation thereof, it is necessary that each size of the thus graded ore particles be independently passed through the ore separating machines. Therefore, in order to increase production it has been found desirable to provide a separating machine for each grade of pulverized ore as shown in Figure 9. As here shown, a series of suitable conveyors 149 are preferably arranged to convey the graded ore from the bins 148 to the bins 27 provided adjacent the feeding end of each separating machine, and from which the ore may be delivered onto the inclined surface of the separating machine by means of the feed control valves 28.

As each grade of pulverized ore is passed through its respective separating machine the different metallics contained therein will be separated from the gang and subsequently from one another as hereinbefore described, and will be delivered into their respective receiving means or conveyors for final discharge into the finished product bins, such as indicated by the letters "I", "Z" and "L" in Figure 9. As here shown, the gang or tailings from each machine is discharged into a conveyor spout 151, from which it is preferably discharged onto a suitable conveyor 152. The middlings or the material from each separating table containing two or more metallics will be conveyed to a series of bins 153 from which such material may be passed through a second separating table or machine, commonly known as the "middlings table" and the different metallics contained therein finally separated from each other.

Thus, it will readily be seen, that by the employment of the novel ore separation process and machine featured in this invention, I am enabled to make a thorough and complete separation of the different metallics contained in a given ore.

I claim as my invention:

1. In an apparatus of the class described, the combination with an oscillatory table, having a plurality of compartments and a porous covering above said compartments, of a pipe extending horizontally through each compartment and provided on its upper side with a line of perforations to upwardly direct a flow of air through said covering, means for independently controlling the supply of air to each compartment, means arranged to retard the flow of material as it is passed over the surface of said table, and means for feeding granules of crushed ore over said table.

2. In an apparatus of the class described, the combination with an inclined separating table mounted for oscillatory and vibratory movements, said table being divided into sections and each section being subdivided into a plurality of spaced parallel compartments, an air discharging pipe provided with perforations on it upper side arranged in each compartment and each pipe provided with an independent control valve, whereby the discharge of air from each compartment may be independently regulated and controlled.

3. In an apparatus of the class described, the combination with an inclined separating table, means for oscillating said table in an arc, means for vertically vibrating said table during its oscillation, and having a plurality of spaced parallel compartments formed therein, of a porous covering enclosing said compartments and forming the upper surface of said table, a series of raised ribs mounted on said covering and extending transversely across said table and adapted to retard the passage of material thereover, a pipe having a plurality of discharge orifices provided in each of said compartments to direct and regulate a flow of air upwardly through said porous covering.

4. In an apparatus of the class described, an oscillatory separating table, a plurality of longitudinal compartments having closed bottoms, a porous material enclosing the open tops of said compartments and forming the upper surface of said table, a horizontally arranged air pipe having orifices in its upper side mounted in each of said compartments and arranged to upwardly direct a flow of air through said porous material, means for independently controlling the supply of air to each of said air pipes, and a suction means arranged over said table adapted to carry off the dust rising from said table.

5. In an apparatus of the class described, the combination with an inclined separating table, means for oscillating said table laterally and vertically, means for vertically vibrating said table during its oscillation, a plurality of compartments formed therein, and an air pipe, having an independent control valve, mounted in each of said compartments, of means for directing the separated materials to their respective receiving means, means adapted to discharge the lighter material and gang from the table into a conveyor, and a dust-collecting hood arranged over said table having a suction trunk connected thereto adapted to convey the dust from the separating table.

6. In an apparatus of the character described, the combination with an oscillating table, having a plurality of compartments and a porous covering above said compartments, of a pipe extending substantially horizontally through each of said compartments, means for independently controlling the supply of air to each of said pipes and each of said pipes having a line of perforations on its upper side, said perforations being directed at such an angle to oppose the movement of material on the table.

In witness whereof, I have hereunto set my hand this 30th day of October, 1923.

JAMES F. REILLY.